March 4, 1969     R. L. VICK     3,430,646
HOT GAS RELIEF VALVE
Filed Nov. 21, 1966
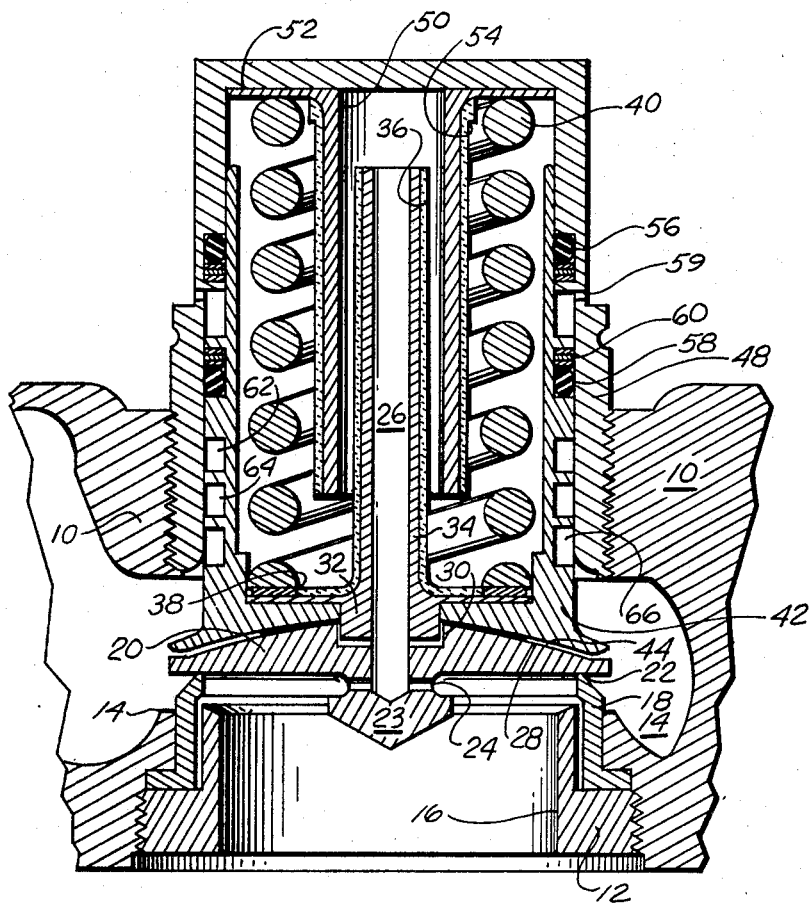
INVENTOR.
RALPH L. VICK
BY
*Robert L. Smith*
ATTORNEY United States Patent Office 3,430,646
Patented Mar. 4, 1969

3,430,646
HOT GAS RELIEF VALVE
Ralph L. Vick, Granada Hills, Calif., assignor to The Bendix Corporation, a corporation of Delaware
Filed Nov. 21, 1966, Ser. No. 595,985
U.S. Cl. 137—375          1 Claim
Int. Cl. F16l 7/00; F16k 17/20, 15/00

ABSTRACT OF THE DISCLOSURE

A balanced type of relief valve is shown having specialized construction for dealing with high temperature gases carrying contaminants such as carbon particles and other finely dispersed solids. A poppet is spring-loaded against an annular seat, the spring being contained in a chamber communicating with the inlet through a small, somewhat circuitous passageway. The chamber is partially enclosed by a cap member threaded to the housing and partially by a piston slidable within the cap and movable with the poppet when the inlet pressure is sufficient to open the poppet. A plurality of annular grooves are formed on the surface of the piston, the one most remote from the outlet containing a seal and others nearest the outlet containing ambient gas or air such that when the valve opens, carrying carbon particles, etc., the gas in these grooves is first caused to flow along the mating surfaces of the cap and piston, thus preventing the solid contaminants from collecting on these surfaces and causing the valve to stick.

---

This invention relates to relief valves, and more particularly to relief valves for use with extremely hot gases as a working fluid. Where extremely hot gases are used, it frequently is a serious problem to design a valve which will operate satisfactorily in such an environment, even for a matter of a few minutes. Such a valve may be part of the overall package relied upon to insure success in a missile-launching venture costing thousands of dollars; therefore, the approach has been to design such valves almost without regard to cost, either in the use of expensive materials or in the use of production methods and tolerances. Unfortunately, the use of relatively expensive materials and methods is not a guarantee of success. For example, it would be usual for this type of application to use seals which are of a relatively expensive, all-metal type, which also generate high friction. Obviously, the high friction is not a desirable characteristic. Costly spring materials, such as Inconel–X, are normally used.

The applicant herein designed a single-stage valve configuration which has been used successfully in meeting the requirements of this application and which was the subject of my Patent No. 3,282,289, assigned to the assignee of the present application. One problem experienced was that after operation over an appreciable number of cycles, hysteresis was experienced in some installations due to impingement of outlet or exhaust gas against the surfaces over which resilient seal members are required to travel during actuation. Such gas normally is quite dirty, containing finely suspended bits of carbon and other combustion products, and the accumulation of such material on the surfaces over which the seals must travel resulted in progressively degraded operation as the number of cycles of operation increased. It is an object of the present invention, therefore, to provide a hot gas relief valve in which the aforementioned disadvantage is eliminated or substantially reduced.

It is another object of the present invention to provide a hot gas relief valve which is simple, reliable, opens widely at a pressure only slightly above that which initiates a spring movement, and which is operable over a substantial number of cycles without appreciable degradation in performance.

It is a further object of the present invention to provide a hot gas relief valve meeting the above objections and in which hysteresis does not increase substantially with many successive cycles of operation, even in a relatively dirty environment.

Other objects and advantages will become apparent from consideration of the following specification taken in connection with the accompanying drawing, in which the single figure is a cross sectional view of a valve incorporating my invention.

Referring now to the drawing, a casing is shown at numeral 10 including an inlet passage 12 and an outlet passage 14. Inserted into housing 10 and serving as an inlet passageway and a retainer for member 18 is an annular member 16 which may be formed of a corrosion-resistant steel. Member 16 is also coated with a heat-resistant coating, such as zirconium oxide, in the inlet passage 12, where it is directly exposed to the high temperature inlet gas. Member 16 is fastened to casing 10 either by being threaded therewith or through other suitable fastening means. An annular valve seat member 18 is carried on member 16 and is also attached to the casing 10 through a gasket seal to effectively seal chamber 12 from chamber 14. Member 18 is formed of a high-temperature material, such as molybdenum titanium alloy. A poppet valve member 20 is arranged to close on the sharp annular valve seat portion 22 of member 18. Poppet member 20, which may be made of the same material as member 18, includes an inwardly extending projection 23 for deflecting the hot gas contaminants toward the outlet port and thus protecting the small orifices 24 from being blocked. The small orifices 24 lead to a passageway 26 on the opposite, or outer, side of poppet member 20. These orifices and the chamber to which they lead form a damping arrangement which prevents valve instability. The outer surface of poppet member 20 includes a partially or slightly spherical surface 28 and a hollowed-out guide section 30. Carried in guide section 30 is a projecting portion 32 of a cylindrical member 34, the interior of which constitutes a continuation of the passageway 26. Cylindrical member 34 may be made of steel or other suitable material. It has a sleeve 36 of insulating material, which may be Teflon, tightly secured to its outer surface. Member 34 also includes a radially extending section 38 which constitutes one of two retainer sections for a spring 40.

A piston member 42 is carried on poppet member 20 and includes a partially spherical surface in mating relationship with a corresponding surface of poppet 20. Since piston 42 is not made of high temperature material, it is desirable to include an insulating gasket 44 between piston 42 and poppet member 20 which limits the heat flow from poppet member 20 into the spring chamber and also seals the mating juncture between the two pieces to form a barrier between chambers 12 and 14.

Threadedly engaged with housing 10 is a cap member 48. A cylindrical baffle member 50 extends from the top of cap member 48 into the interior of said cap in such manner as to surround concentrically the cylindrical member 34. Baffle 50 also includes an annular flange 52 which serves as the upper retainer for spring 40. A Teflon sleeve 54 may also be secured to the outside surface of cylindrical baffle member 50.

From the foregoing, it will be apparent that although poppet member 20, cylindrical member 34, and piston 42 are all separate members, once assembled they move essentially as a unit. The mating, partially spherical surfaces of piston 44 and poppet member 20 serve to keep these two members in the desired axial alignment. Similarly the depression 30 in poppet 20 and the mating projection on cylindrical member 34 hold member 34 in axial alignment with poppet member 20. The poppet assembly is free to move upwardly under pressure from the inlet chamber 12 by an amount equal to the clearance between the top of piston member 42 and the outside surface of the top of cap 48. Since the radius of the valve seat 22 is comparatively large, a small axial movement of the poppet assembly will provide a substantial metering area.

In considering the operation of the above described valve structure, it will first be assumed that hot gas is present in the inlet passageway 12 but at a pressure insufficient to open the poppet. Some of this gas will, however, flow through the ports 24 into chamber 26 through the hollow interior of cylindrical member 34 down a passageway formed between members 34 and 50, and into the chamber containing spring 40. In this chamber the gas is held in an essentially static condition, since it is effectively blocked from flowing to the outlet port 14 by means of a seal 56 located in an inwardly directed circumferential groove in cap member 48. A similar seal 58 prevents exhaust pressure from flowing to the exterior through orifices 59 and balances the seat area so that a variation in exhaust pressure does not change the setting of the valve. Seal 58 is located in an external circumferential groove formed in the surface of piston member 42. A plurality of additional circumferential grooves 62, 64 and 66 are also formed in the surface of member 42, and it is the purpose of these grooves to trap and hold ambient gas and to prevent gas flowing in the outlet passage 14 from forcing its way up between piston 42 and cap member 48.

It will be recognized that seals 56 and 58 are similar except that seal 56 is located in a stationary outside member and must permit an internally positioned member to slide relative to itself while seal 58 is positioned on the internal piston member 42 where it seals to the outside against the stationary member within which it moves. The details of these seals do not form a part of the present invention, but such seals may consist of a number of parts including an annular rubber O-ring which is held in position by means of a sealing ring which is preferably of polytetrafluoroethylene material (Teflon) which is in direct contact with the piston member 42. If desired, an additional polytetrafluoroethylene ring 64 may be included, and this may also be backed up by means of a pair of metal sealing rings. With the particular seal design described, most of the contacting material is of polytetrafluoroethylene material which has very high self-lubricating properties, thereby providing for a minimum of friction. In a high-temperature application, the polytetrafluoroethylene material has a tendency to soften and flow somewhat, and the metal seals or back-up rings are effective to prevent or severely limit the flow of the softer sealing members.

As pressure increases in inlet passage 12, a value is reached at which the gas pressure in the chamber carrying spring 40 acting downwardly against the poppet assembly plus the force exerted by spring 40 is insufficient to resist the force in the inlet passage acting against the lower side of poppet valve 20, and the poppet valve 20 begins to open. Gas then flows rapidly across seat 22 into outlet passage 14. Since this fluid is flowing both upwardly and in a direction essentially normal to the direction of movement of the valve, a force will result having a significant component acting upwardly, thereby tending to aid the inlet pressure in forcing the poppet member 20 open. Inasmuch as this arrangement permits the spring 40 to exert a comparatively low force, this reactive force helps to cause the poppet assembly to move to a full open position under very little pressure increase over that required for initial opening.

Of primary concern in the application for which this device was made is the necessity for protecting spring 40 and seals 56 and 58 to retain proper calibration of the relief valve. An essential part of protecting the spring 40 and seals 56 and 58 is the maintenance of minimal leakage past seals 56 and 58 to thereby provide assurance that the gas and the chamber containing spring 40 will be essentially static. After the initial gas flows from orifices 24 into the chamber 26 and through the path defined by cylindrical member 34 and baffle member 50, there is no real outlet for the gas and therefore no substantial addition to the chamber. The insulating sleeves 36 and 54, which may be of polytetrafluorethylene material, tend to cause the heat in members 34 and 50, respectively, to flow into cap 48 where it is dissipated to the outside of the valve member. Spring 40 is further protected by interposing asbestos gaskets between itself and the annular retainer members 38 and 52, if desired.

The hot gas flowing in outlet passage 14 may still retain substantial energy and be under relatively high pressure. This fluid has a tendency to flow between the piston member 42 and the cap 48 in such manner as to impinge upon the interior surface of the cap member 48 and the exterior surface of the piston 42. Since this exhaust gas is frequently dirty and contains finely suspended particles of carbon and other products of combustion, these particles have a tendency to build up on the surfaces. In particular, the interior surface of the cap member over which seal 58 slides during operation tends to become contaminated with successive cycles of operation such that the force required to push seal 58 past the mating surface becomes high enough to cause a measurable hysteresis in the valve operation. Through the use of the additional grooves 62, 64 and 66, this problem is obviated since the exhaust gas flowing into groove 66 tends to force the clean gas in groove 66 in the direction of groove 64, and if the exhaust gas reaches groove 64 it must still force the clean gas in groove 64 out of this groove, and also the clean gas out of groove 62 out past seal 58 and out of orifice 59 before it can begin to deposit contaminating material on the interior wall of the cap member. Inasmuch as the quantity of clean gas contained in the grooves 62, 64 and 66 is rather substantial in relation to what can be forced past the seal 58 in a normal period of usefulness for a valve of this kind, there is always clean gas adjacent the sliding surface over which seal 58 must move, and therefore there is no buildup of carbon particles, etc. on this sliding surface. This arrangement very substantially extends the period of operation of this valve before the beginning of any measurabe hysteresis.

I claim:
1. A hot gas relief valve comprising a casing defining an inlet passage extending inwardly from the exterior of the casing and defining a valve seat element at the inner end of said passage and an outlet passage extending from said seat element to the exterior of said casing;
   a cap member adjustably fastened to said casing including a cylindrical baffle of material having rapid heat transfer properties;
   a poppet member within said casing movable between open and closed positions with respect to said seat element to interconnect and disconnect said passages respectively, said poppet member including an inner contact portion and an outer portion including a cylindrical member open at its outer end connected with said contact portion at its inner end by flow-restricting means, said cylindrical member being concentrically positioned within said cylindrical baffle member and cooperating therewith to provide an elongated path for gas flow between said inlet passage and the exterior of said cylindrical baffle member, and a piston member slidably engaged with the inner surface of said cap member, said piston member having formed thereon a plurality of external circumferential grooves adjacent said cap member, at least one of said grooves most remote from said outlet passage containing resilient means ef- fecting a fluid seal against said cap member and a plurality of said grooves nearest said outlet passage containing ambient gas; and resilient means positioned between said piston member and said cylindrical baffle member urging said poppet member against said seat element, whereby the gas pressure in said inlet passage acting against said contact portion is opposed by the gas pressure acting against said outer portion and the force exerted by said resilient means.

References Cited

UNITED STATES PATENTS

| 1,221,719 | 4/1917 | Fritch | 137—469 |
| 3,282,289 | 11/1966 | Vick | 137—469 XR |

HAROLD W. WEAKLEY, *Primary Examiner.*

U.S. Cl. X.R.

137—469, 540